US010054322B2

(12) United States Patent
Lee et al.

(10) Patent No.: US 10,054,322 B2
(45) Date of Patent: Aug. 21, 2018

(54) APPARATUS FOR BOTH HUMIDIFICATION AND AIR CLEANING

(71) Applicant: LG Electronics Inc., Seoul (KR)

(72) Inventors: Jongsu Lee, Seoul (KR); Taeyoon Kim, Seoul (KR); Kunyoung Lee, Seoul (KR); Kyoungho Lee, Seoul (KR); Jungwoo Lee, Seoul (KR); Jieun Choi, Seoul (KR); Sanghyuk Son, Seoul (KR)

(73) Assignee: LG ELECTROINCS INC., Seoul (KR)

( * ) Notice: Subject to any disclaimer, the term of this patent is extended or adjusted under 35 U.S.C. 154(b) by 103 days.

(21) Appl. No.: 15/338,146

(22) Filed: Oct. 28, 2016

(65) Prior Publication Data

US 2017/0122595 A1    May 4, 2017

Related U.S. Application Data

(60) Provisional application No. 62/355,118, filed on Jun. 27, 2016, provisional application No. 62/248,463, filed on Oct. 30, 2015.

(30) Foreign Application Priority Data

Nov. 7, 2015  (KR) .......................... 10-2015-0156254
Dec. 24, 2015  (KR) .......................... 10-2015-0185864
(Continued)

(51) Int. Cl.
*F24F 3/00*    (2006.01)
*B01F 3/04*    (2006.01)
(Continued)

(52) U.S. Cl.
CPC ............... *F24F 6/04* (2013.01); *B01D 46/10* (2013.01); *B01F 3/04007* (2013.01);
(Continued)

(58) Field of Classification Search
CPC ........... F24F 3/14; B01F 3/04; B01F 3/04007; B01F 3/04085
(Continued)

(56) References Cited

FOREIGN PATENT DOCUMENTS

DE    44 14 598 A1    11/1995
EP    2 860 464 A1    4/2015
(Continued)

*Primary Examiner* — Robert A Hopkins
(74) *Attorney, Agent, or Firm* — Dentons US LLP

(57) ABSTRACT

Provided is a humidification and air cleaning apparatus. The humidification and air cleaning apparatus includes: a base body including a water tank insertion space formed therein; a water tank having an upper side thereof opened, storing water therein, placed in the water tank insertion space, and separable from the base body; a top cover assembly disposed over an opened upper part of the water tank and disposed separably from the water tank; an air wash inlet formed at a side of the water tank and receiving air into the water tank; a discharge flow passage formed in at least one of the top cover assembly and the water tank, or formed between the top cover assembly and the water tank; and a water supply flow passage disposed inside the top cover assembly and guiding water into the water tank.

19 Claims, 13 Drawing Sheets

(30) Foreign Application Priority Data

| | | |
|---|---|---|
| Mar. 28, 2016 | (KR) | 10-2016-0037235 |
| Jun. 30, 2016 | (KR) | 10-2016-0083061 |
| Jun. 30, 2016 | (KR) | 10-2016-0083071 |
| Oct. 6, 2016 | (KR) | 10-2016-0129315 |

(51) Int. Cl.

| | |
|---|---|
| *F24F 6/04* | (2006.01) |
| *B01D 46/10* | (2006.01) |
| *F24F 13/20* | (2006.01) |
| *F24F 13/08* | (2006.01) |
| *F24F 13/28* | (2006.01) |
| *F24F 3/14* | (2006.01) |
| *F24F 6/00* | (2006.01) |
| *F24F 11/00* | (2018.01) |
| *F24F 11/52* | (2018.01) |

(52) U.S. Cl.
CPC ............ *B01F 3/04085* (2013.01); *F24F 3/14* (2013.01); *F24F 13/082* (2013.01); *F24F 13/20* (2013.01); *F24F 13/28* (2013.01); *B01D 2279/50* (2013.01); *F24F 11/52* (2018.01); *F24F 2006/008* (2013.01); *F24F 2006/046* (2013.01); *F24F 2011/0091* (2013.01)

(58) Field of Classification Search
USPC .......................................................... 261/72.1
See application file for complete search history.

(56) References Cited

FOREIGN PATENT DOCUMENTS

| | | | |
|---|---|---|---|
| EP | 2 865 956 A1 | | 4/2015 |
| JP | 08061717 A | * | 3/1996 |
| JP | 2005-274041 A | | 10/2005 |
| JP | 2008-82683 A | | 4/2008 |
| JP | 2008-145035 A | | 6/2008 |
| JP | 2015-75285 A | | 4/2015 |
| KR | 10-2012-0036142 A | | 4/2012 |
| KR | 10-2012-0076284 A | | 7/2012 |
| KR | 10-2013-0031635 A | | 3/2013 |
| WO | 2015/016658 A1 | | 2/2015 |

* cited by examiner

APPARATUS FOR BOTH HUMIDIFICATION AND AIR CLEANING

CROSS-REFERENCE TO RELATED APPLICATIONS

This application claims the benefit of U.S. Provisional Patent Application No. 62/248,463, filed on Oct. 30, 2015, U.S. Provisional Patent Application No. 62/355,118, filed on Jun. 27, 2016, Korean Patent Application No. 10-2015-0156254, filed on Nov. 7, 2015, Korean Patent Application No. 10-2015-0185864, filed on Dec. 24, 2015, Korean Patent Application No. 10-2016-0037235, filed on Mar. 28, 2016, Korean Patent Application No. 10-2016-0083061, filed on Jun. 30, 2016, Korean Patent Application No. 10-2016-0083071, filed on Jun. 30, 2016, and Korean Patent Application No. 10-2016-0129315, filed on Oct. 6, 2016 which are incorporated herein by reference for all purposes as if fully set forth herein.

BACKGROUND OF THE INVENTION

The present invention disclosed herein relates to an apparatus for both humidification and air cleaning.

Air conditioning apparatuses include air conditioners that control the temperature of air, air cleaners that remove foreign substances from air to maintain air cleanliness, humidifiers that increase humidity in the air, and dehumidifiers that reduce humidity in the air.

Typical humidifiers are classified into a vibration type which atomizes water on a vibrating plate and discharges it into air and a natural evaporation type that evaporates water in a humidification filter.

The natural evaporation type of humidifier is classified into a disc type of humidifier which rotates a disc using a driving force and allows water to naturally evaporate from the surface of the disc in the air and a humidification filter type of humidifier which allows water to naturally evaporate from a wet humidification medium by flowing air.

In a typical humidifier, a portion of flowing air during the humidification process is filtered by a filter.

However, since a typical humidifier is used only in a low humidity season and an air cleaner has no humidification function, a user needs to purchase both products.

Also, since a typical humidifier has an air cleaning function as an additional function in addition to a humidification function as a main function, the air cleaning function is weak.

Furthermore, there is a limitation in that a typical humidifier or air cleaner cannot separately operate the humidification or air cleaning function.

SUMMARY OF THE INVENTION

The present invention provides a humidification and air cleaning apparatus which can supply water even when air is being discharged.

The present invention also provides a humidification and air cleaning apparatus which can allow a user to check the water level of the water tank when a user pours water into an operation water inlet.

The present invention also provides a humidification and air cleaning apparatus which includes a top cover assembly separable therefrom.

The present invention also provides a humidification and air cleaning apparatus which can transmit/receive power and control signals to/from a separable top cover assembly.

The present invention also provides a humidification and air cleaning apparatus which can place a separable top cover assembly on a visual body, and can transmit/receive power and control signals when the top cover assembly is placed on the visual body.

The objectives of the present invention are not limited to the above-mentioned objectives, and other objectives that are not mentioned will be clearly understood by persons skilled in the art from the following description.

Embodiments of the present invention provide humidification and air cleaning apparatuses including: a base body including a water tank insertion space formed therein; a water tank having an upper side thereof opened, storing water therein, placed in the water tank insertion space, and separable from the base body; a top cover assembly disposed over an opened upper part of the water tank and disposed separably from the water tank; an air wash inlet formed at a side of the water tank and receiving air into the water tank; a discharge flow passage formed in at least one of the top cover assembly and the water tank, or formed between the top cover assembly and the water tank; and a water supply flow passage disposed inside the top cover assembly and guiding water into the water tank.

In some embodiments, when water is supplied from the upper side of the top cover assembly, supplied water may flow into the water tank through the water supply flow passage.

In some embodiments, the top cover assembly may be separable from the water tank, and may be placed over an opened side of the water tank.

In some embodiments, at least a portion of the water tank may include a visual body formed of a transparent material. The visual body may be disposed over the water tank and may be separable from the base body together with the water tank.

In some embodiments, the base body may include a base connector, and the top cover assembly may include a top connector. The base connector and the top connector may be electrically connected to each other.

In some embodiments, at least a portion of the water tank may include a visual body formed of a transparent material, and the visual body may be disposed over an opened upper side of the water tank, and may be separable from the base body together with the water tank. The visual body may include a connector opening. When the top cover assembly is placed in the visual body, the base connector and the top connector may be electrically connected to each other through the connector opening.

In some embodiments, the visual body may further include a connector support on which the top connector is placed, and the connector opening may be formed in the connector support.

In some embodiments, the base connector may further include a base connector communication unit, and the top connector may further include a top connector communication unit. Control signals of the base connector communication unit and the top connector communication unit may be mutually transmitted and received through the visual body.

In some embodiments, the base connector communication unit and the top connector communication unit may mutually transmit and receive a control signal through an IR signal. The top connector may further include a top connector window that transmits an IR signal. The base connector may further include a base connector window that transmits an IR signal, and the connector support may be formed of a transparent material that transmits an IR signal.

In some embodiments, the top cover assembly may include: a top cover grille including the water supply flow passage and the discharge flow passage separated from each other; an operation module assembled with the top cover grille and receiving an operation signal from a user; and a top connector providing power or a control signal to the operation module. When the top cover assembly is placed in the visual body, the base connector and the top connector may be electrically connected to each other.

In some embodiments, the operation module may further include an upper water supply guide that guides water supplied from the upper side into the water supply flow passage.

In some embodiments, the operation module may further include an operation water inlet forming at least a portion of the water supply flow passage therein, and the water supply flow passage formed in the top cover grille may communicate with the operation water inlet.

In some embodiments, the operation module may include: an operation housing assembled with the top cover grille; an operation water inlet formed inside the operation housing and forming at least a portion of the water supply flow passage; an input unit disposed in the operation housing and receiving an operation signal from a user; and an operation controller for controlling the input unit. The operation controller may be electrically connected to the top connector.

In some embodiments, the operation housing may include: an upper operation housing including the water supply flow passage formed therein; a lower operation housing assembled with the upper operation housing and forming the water supply flow passage therein; and an inner wall disposed in at least one of the upper operation housing and the lower operation housing and forming the operation water inlet.

In some embodiments, the humidification and air cleaning apparatus may include an operation space among the upper operation housing, the lower operation housing and the inner wall, wherein the operation space is sealed from the water supply flow passage, and the operation controller and the input unit are disposed in the operation space.

In some embodiments, the upper operation housing may further include an upper water supply guide that guides water supplied from the upper side into the operation water inlet, and the upper water supply guide may be an inclination surface formed on the upper operation housing.

In some embodiments, the operation module may further include a water level display unit that displays a water level of the water tank, and upon water supply from the upper side, the water level display unit may display the water level on the operation housing.

In some embodiments, the operation housing may have an upper side surface thereof including an inner inclination surface that inclines toward the operation water inlet and an outer inclination surface that inclines in an opposite direction to the inner inclination surface. The input unit may be disposed on the outer inclination surface, and the water level display unit may be disposed on the inner inclination surface. The input unit, the operation water inlet, and the water level display unit may be disposed on a straight line with respect to an eye line of a user.

In some embodiments, the humidification and air cleaning apparatus may include a discharge humidification medium disposed under the top cover assembly, wherein the discharge humidification medium covers the discharge flow passage and humidifies air passing through the discharge flow passage.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
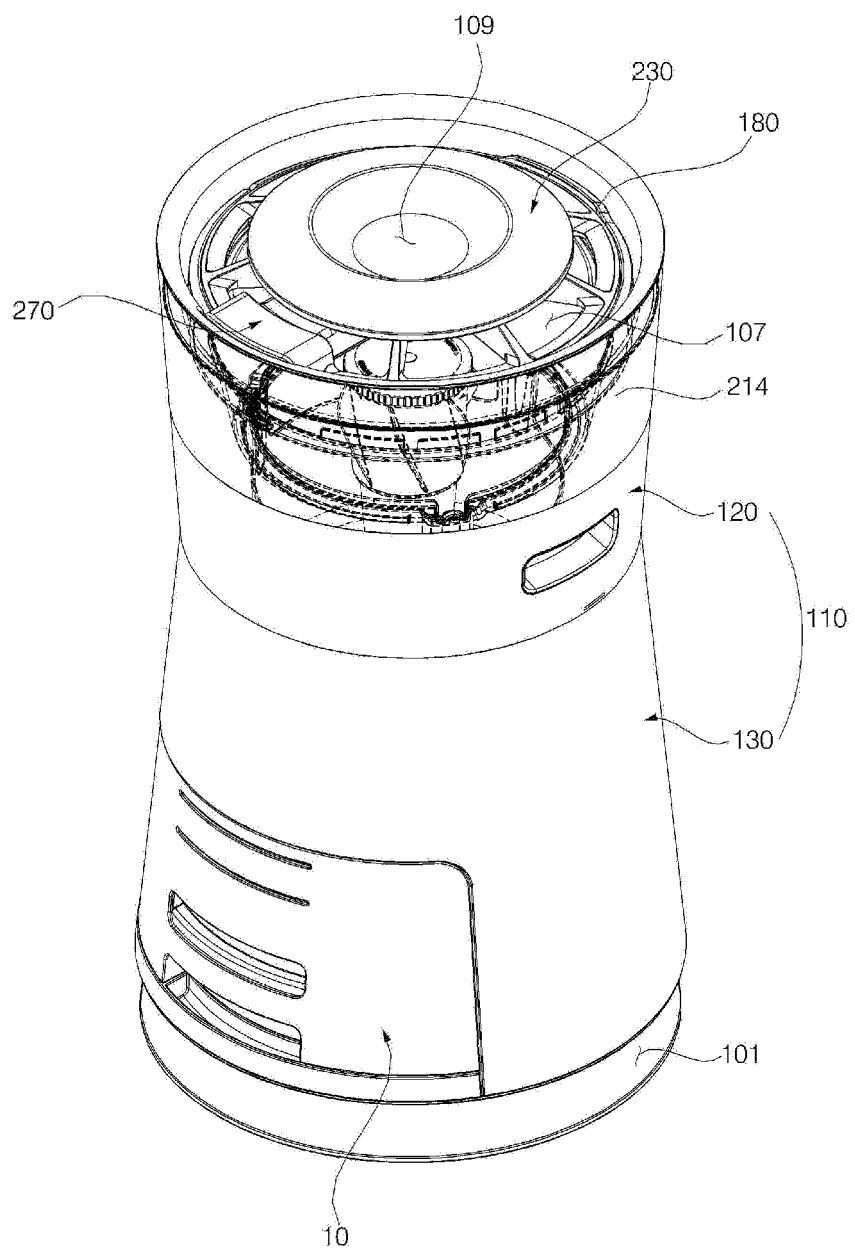
FIG. 1 is a perspective view illustrating a humidification and air cleaning apparatus according to a first embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Hereinafter, exemplary embodiments of the present invention will be described in detail with reference to the accompanying drawings.

Figure 2:
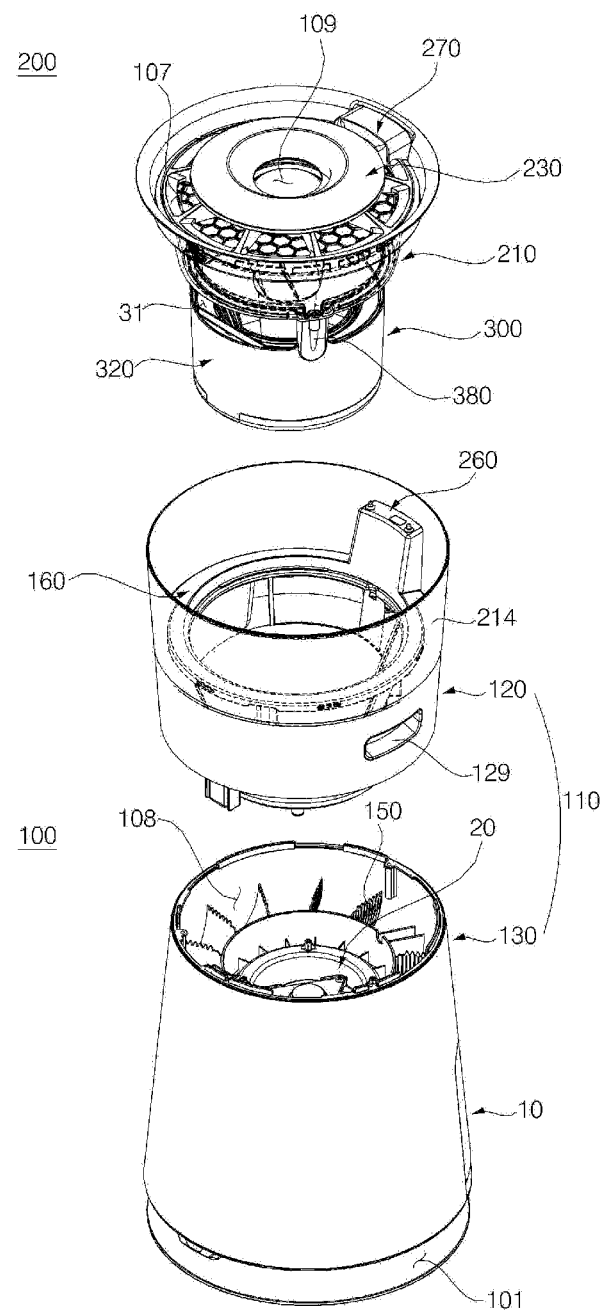
FIG. 2 is an exploded perspective view of FIG. 1.
Figure 3:
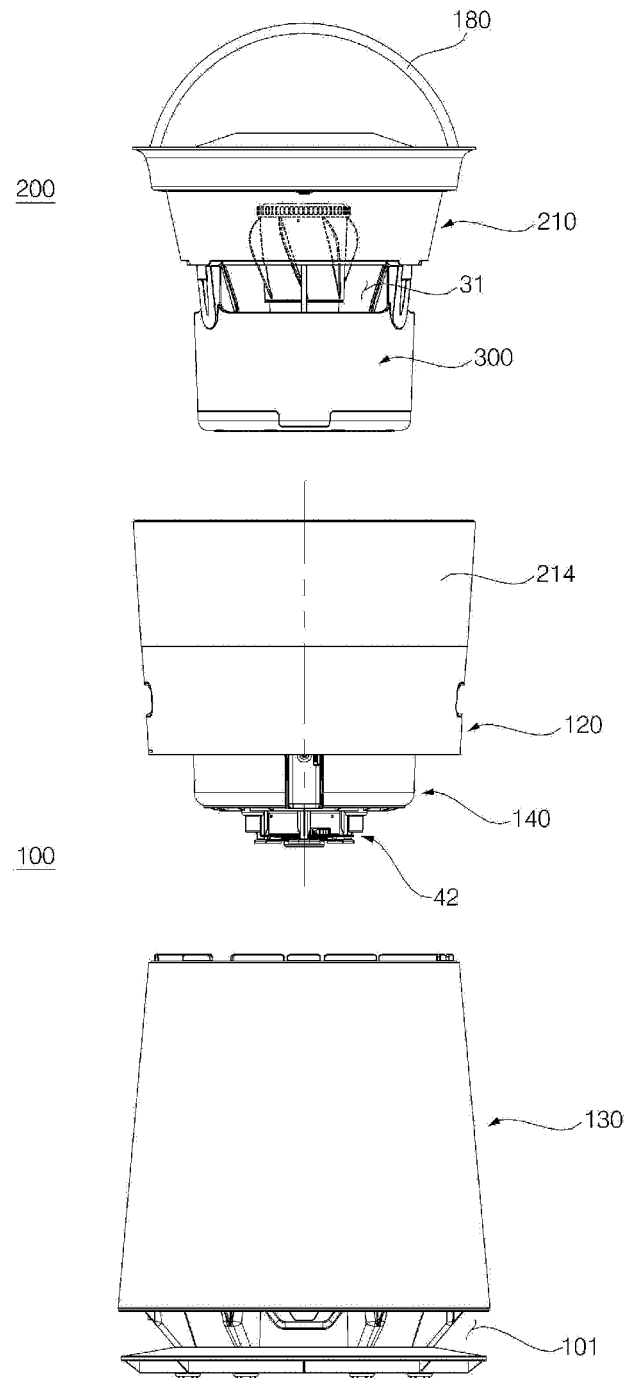
FIG. 3 is an exploded front view of FIG. 1.
Figure 4:
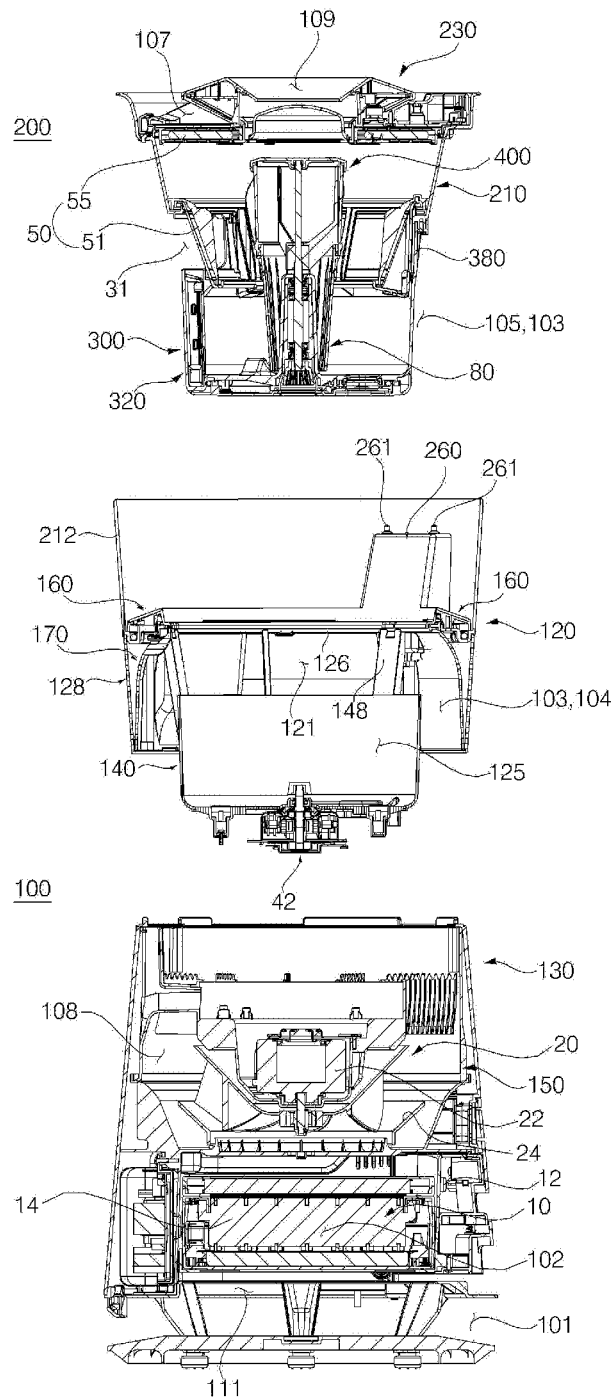
FIG. 4 is an exploded cross-sectional view of FIG. 3.
Figure 5:
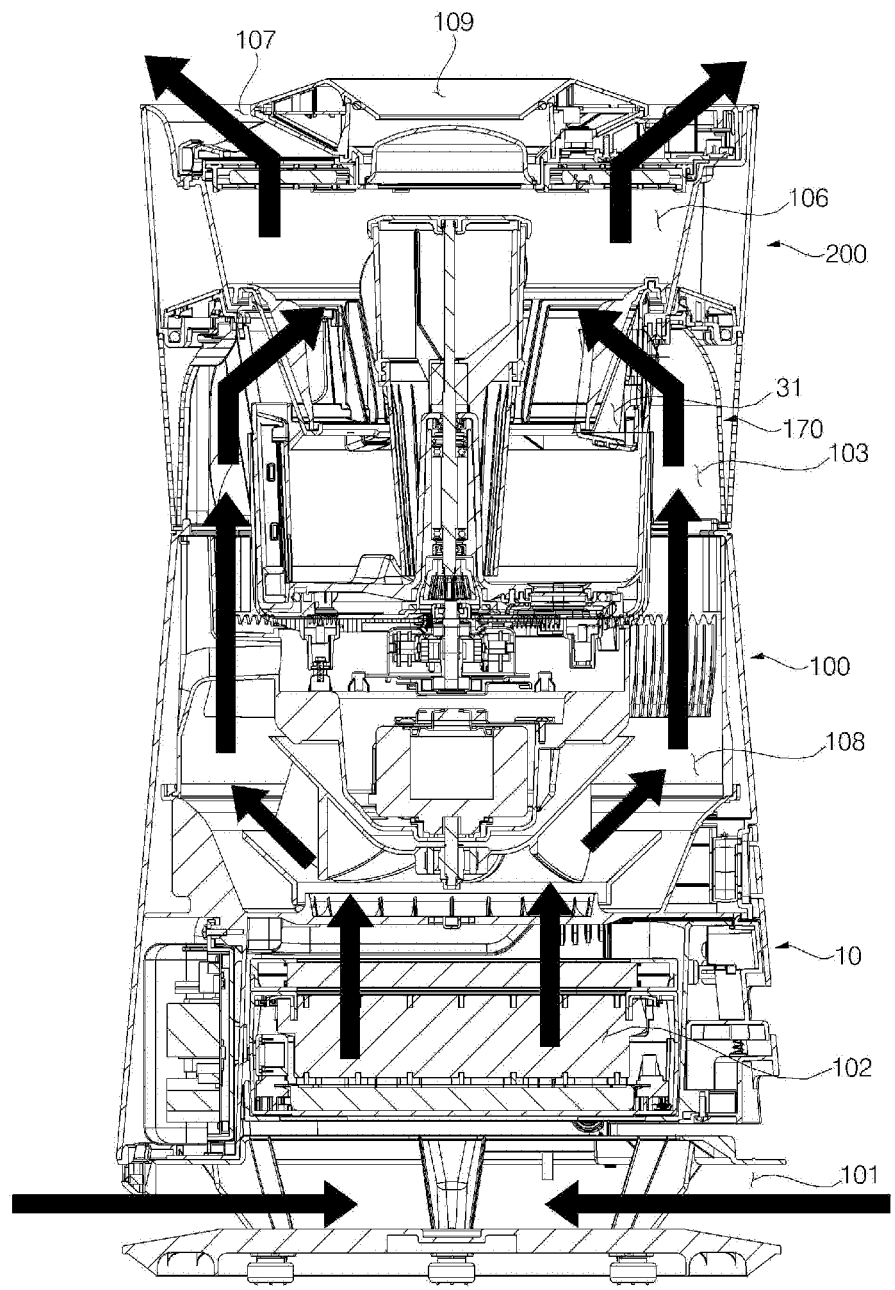
FIG. 5 is a view illustrating an air flow of the humidification and air cleaning apparatus according to the first embodiment of the present invention.
Figure 6:
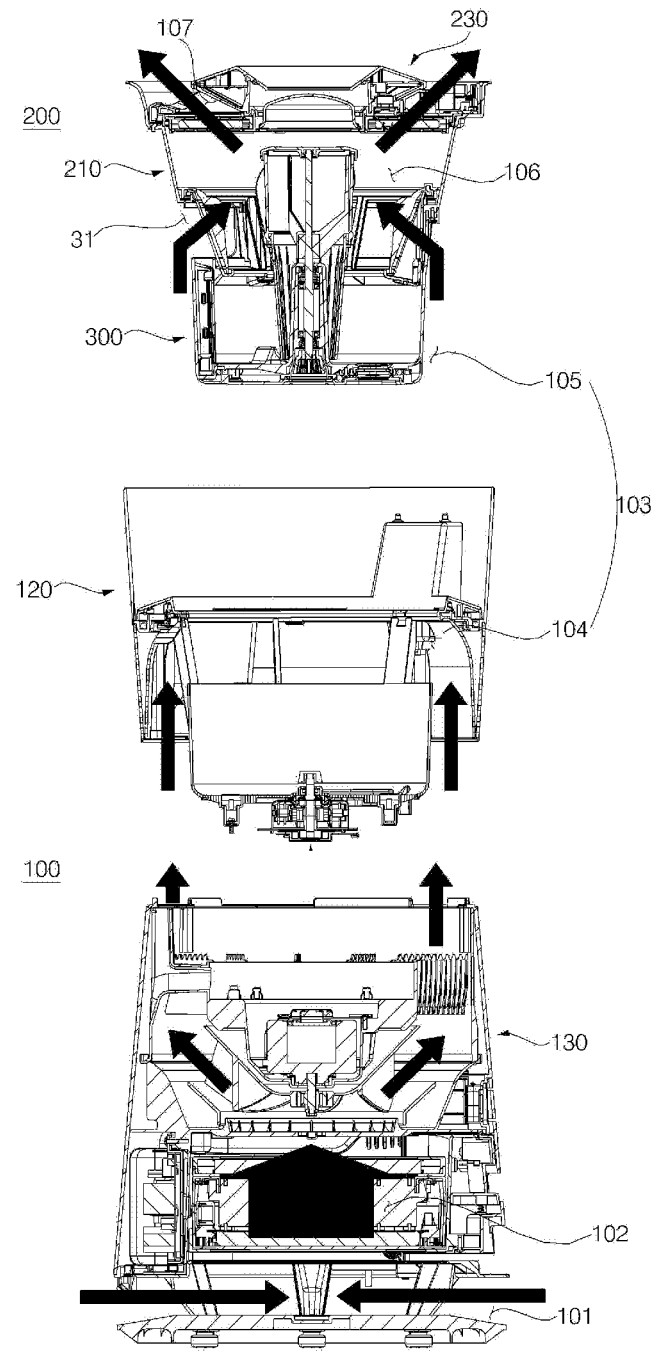
FIG. 6 is a view illustrating an air flow of the humidification and air cleaning apparatus shown in FIG. 4.

FIG. 1 is a perspective view illustrating a humidification and air cleaning apparatus according to a first embodiment of the present invention. FIG. 2 is an exploded perspective view of FIG. 1. FIG. 3 is an exploded front view of FIG. 1. FIG. 4 is an exploded cross-sectional view of FIG. 3. FIG. 5 is a view illustrating an air flow of the humidification and air cleaning apparatus according to the first embodiment of the present invention. FIG. 6 is a view illustrating an air flow of the humidification and air cleaning apparatus shown in FIG. 4.

A humidification and air cleaning apparatus according to an embodiment of the present invention may include an air clean module 100 and an air wash module 200 disposed over the air clean module 100.

The air clean module 100 may take in and filter external air, and may provide filtered air to the air wash module 200. The air wash module 200 may be supplied with filtered air, may perform humidification to provide moisture, and may discharge humidified air to the outside.

The air wash module 200 may include a water tank 300 for storing water. The water tank 300 may be separable from the air clean module 100 when the air wash module 200 is separated. The air wash module 200 may be disposed over the air clean module 100.

A user can separate the air wash module 200 from the air clean module 100, and can clean the air wash module 200 that is separated. A user may also clean the inside of the air clean module 100 from which the air wash module 200 is separated. When the air wash module 200 is separated, the upper surface of the air clean module 100 may be opened to a user.

The air clean module 100 may include a filter assembly 10 described later, and may be cleaned after the filter assembly 10 is separated from a base body 110.

A user may supply water into the air wash module 200. The air wash module 200 may have a water supply flow passage 109 formed therein to supply water from the outside to the water tank 300.

The water supply flow passage 109 may be configured to be separated from a discharge flow passage 107 from which air is discharged. The water supply flow passage 109 may be configured to supply water into the water tank 300 at any moment. For example, even when the air wash module 200 is operating, water can be supplied through the water supply flow passage. For example, even when the air wash module 200 is coupled to the air clean module 100, water can be supplied through the water supply flow passage. For example, even when the air wash module 200 is decoupled from the air clean module 100, water can be supplied through the water supply flow passage.

The air clean module 100 and the air wash module 200 may be connected to each other through a connection flow passage 103. Since the air wash module 200 is separable, the connection flow passage 103 may be distributedly disposed at the air clean module 100 and the air wash module 200. Only when the air wash module 200 is placed over the air clean module 100, the flow passage of the air wash module 200 and the flow passage of the air clean module 100 may communicate with each other through the connection flow passage 103.

The connection flow passage formed in the air clean module 100 may be defined as a clean connection flow passage 104, and the connection flow passage formed in the air wash module 200 may be defined as a humidification connection flow passage 105.

The flow of air passing through the air clean module 100 and the air wash module 200 will be described in more detail later.

Hereinafter, the air clean module 100 and the air wash module 200 will be described in more detail.

The air clean module 100 may include a base body 110, a filter assembly 10 that is disposed in the base body 110 and filters air, and an air blowing unit 20 that blows air.

The air wash module 200 may include a water tank 300, a watering unit 400, a humidification medium 50, a visual body 210, and a top cover assembly 230. The water tank 300 may store water for humidification, and may be detachably disposed over the air clean module 100. The watering unit 400 may be disposed in the water tank 300, and may spray water in the water tank 300. The humidification medium 50 may be wetted with water sprayed from the watering unit 400, and may provide moisture to flowing air. The visual body 210 may be coupled to the water tank 300, and may be formed of a transparent material. The top cover assembly 230 may be detachably disposed over the visual body 210, and may include a discharge flow passage 107 through which air is discharged and a water supply flow passage 109 through which water is supplied.

The air clean module 100 may include an intake flow passage 101, a filtering flow passage 102, an air blowing flow passage 108, and a clean connection flow passage 104 disposed therein. Air entered through the intake flow passage 101 may flow to the clean connection flow passage 104 via the filtering flow passage 102 and the air blowing flow passage 108.

The air wash module 200 may include a humidification connection flow passage 105, a humidification flow passage 106, a discharge flow passage 107, and a water supply flow passage 109 disposed therein.

When the air wash module 200 is placed over the air clean module 100, the clean connection flow passage 104 of the air clean module 100 and the humidification connection flow passage 105 of the air wash module 200 may be connected to each other.

Filtered air supplied through the humidification connection flow passage 105 of the air wash module 200 may be discharged into the indoor via the humidification flow passage 106 and the discharge flow passage 107. The water supply flow passage 109 may be manufactured into a structure in which air is not discharged and only water is supplied while communicating with the humidification flow passage 106.

First, each configuration of the air clean module 100 will be described.

The base body 110 may include an upper body 120 and a lower body 130. The upper body 120 may be disposed on the lower body 130, and the upper body 120 and the lower body 130 may be assembled.

Air may flow into the base body 110.

The intake flow passage 101, the filtering flow passage 102, and the air blowing flow passage 108 may be disposed in the lower body 130, and structures that define the intake flow passage 101, the filtering flow passage 102, and the air blowing flow passage may be disposed in the lower body 130.

A portion of the connection flow passage 103 may be disposed in the upper body 120, and structures for guiding filtered air to the air wash module 200 and structures for supporting the air wash module 200 may be disposed in the upper body 120.

The base body 110 may include the lower body 130 defining the exterior thereof and having an inlet hole 110 formed in the undersurface thereof, and the upper body 120 defining the exterior thereof and coupled to the upper side of the lower body 130.

The filter assembly 10 may be detachably assembled in the base body 110.

The filter assembly 10 may provide the filtering flow passage 102, and may filter external air. The filter assembly 10 may have a structure that is detachable from the base body 110 in a horizontal direction. The filter assembly 10 may be disposed so as to cross the flowing direction of air that flows upstream in a vertical direction. The filter assembly 10 may slide in a horizontal direction, and may filter air that flows upward in a vertical direction. The filter assembly 10 may be disposed in a horizontal direction, and may form the filtering flow passage 102 in a vertical direction.

The filter assembly 10 may slide in a horizontal direction with respect to the base body 110.

The filter assembly 10 may include a filter housing 11 disposed in the lower body 130 and forming the filtering flow passage 102, and a filter 14 separably coupled to the filter housing 11 and filtering air passing the filtering flow passage 102.

The filter housing 12 may communicate with the intake flow passage 101 at the lower side thereof, and may communicate with the air blowing flow passage 108 at the upper side thereof. Air entered through the intake flow passage 101 may flow to the air blowing flow passage 108 via the filtering flow passage 102.

The filter housing 12 may be opened at one side thereof in a direction crossing the filtering flow passage 102. The filter 14 may detachably coupled through the opened surface of the filter housing 12. The opened surface of the filter housing 12 may be formed in a lateral direction. The opened surface of the filter housing 12 may be disposed on the outer surface of the lower body 130. Accordingly, the filter 14 may be inserted through the side surface of the lower body 130, and may be located inside the filter housing 12. The filter 14 may be disposed to cross the filtering flow passage 102, and may filter air passing the filtering flow passage 102.

The filter 14 may be an electric duct collecting filter that collects foreign substances in the air by electrifying the filter using applied power. The filter 14 may be formed of a material that collects foreign substances in the air through a filter medium. The filter 14 may be disposed in various structures. The scope of the inventive invention is not limited to the filtering method or the filter medium of the filter 14.

The filtering flow passage 102 may be disposed in the same direction as the main flowing direction of the humidification and air cleaning apparatus. In this embodiment, the filtering flow passage 102 may be disposed in a vertical direction, and may allow air to flow in the opposite direction to gravity. That is, the main flowing direction of the humidification and air cleaning apparatus may be formed so as to direct from bottom to top.

The air blowing unit 20 may be disposed over the filter housing 12.

The upper side surface of the filter housing 12 may be opened, and air passing the filtering flow passage 102 may flow to the air blowing unit 20.

The air blowing unit 20 may generate flowing of air. The air blowing unit 20 may be disposed inside the base body 110, and may allow air to flow from the lower side to the upper side.

The air blowing unit 20 may include a blower housing 150, a blower motor 22, and a blower fan 24. In this embodiment, the blower motor 22 may be disposed at an upper side, and the blower fan 24 may be disposed at a lower side. The motor shaft of the blower motor 22 may direct to bottom, and may be coupled to the blower fan 24.

The blower housing 150 may be disposed inside the base body 110. The blower housing 150 may provide a flow passage of flowing air. The blower motor 22 and the blower fan 24 may be disposed in the blower housing 150.

The blower housing 150 may be disposed over the filter assembly 10, and may be disposed under the upper body 120.

The blower housing 150 may form the air blowing flow passage 108 therein. The blower fan 24 may be disposed in the air blowing flow passage 108. The air blowing flow passage 108 may connect the filtering flow passage 102 and the clean connection flow passage 104.

The blower fan 24 may be a centrifugal fan, and may admit air from the lower side thereof and discharge air to the outside in a radial direction. The blower fan 24 may discharge air to the upper side and the outside in a radial direction. The outer end of the blower fan 24 may be disposed to direct to the upper side in a radial direction.

The blower motor 22 may be disposed over the blower fan 24 to minimize contact with flowing air. The blower motor 22 may be installed so as to be covered by the blower fan 24. The blower motor 22 may not be located on the airflow passage by the blower fan 24, and may not generate a resistance against air flowing by the blower fan 24.

The upper body 120 may include an upper outer body 128 forming the exterior of the base body and coupled to the lower body 130, an upper inner body 140 disposed inside the upper outer body 128, having the water tank 300 inserted therein, and providing the connection flow passage 103, and an air guide 170 coupling the upper inner body 140 and the upper outer body 128 and guiding air to the water tank 300.

Since the upper body 120 is disposed to separate the connection flow passage and the water tank insertion space, water of the water tank 300 flowing into the connection flow passage can be minimized. Particularly, since the connection flow passage is divided by the upper inner body 140 and disposed outside a space in which water is stored, water can be inhibited from flowing into the connection flow passage.

The upper inner body 140 may be formed to be opened at the upper side thereof, and may receive the water tank 300. The upper inner body 140 may form a portion of the clean connection flow passage 104 into which filtered air flows.

The upper inner body 140 may have an upper inlet 121 formed therein and corresponding to an air wash inlet 31. The upper inlet 121 may not be an essential component. It may be sufficient if the upper body 120 has a shape that exposes the air wash inlet 31 to the connection flow passage 103.

The air guide 170 may guide air supplied through the clean connection flow passage 104 to the upper inlet 121. The air guide 170 may collect air rising along the outside of the base body 110 toward the inside. The air guide 170 may change the flowing direction of air flowing from the lower side to the upper side. However, the air guide 170 may minimize the flow resistance of air by minimizing the change angle of the flow direction of air.

The air guide 170 may cover the outside of the upper inner body 140 360 degrees of a circumference of the upper inner body 140. The air guide 170 may guide air to the water tank 300 in all directions of 360 degrees of a circumference of the water tank 300. The air guide 170 may inwardly collect air guided along the outside of the lower body 130, and may supply the collected air to the water tank 300. Through this structure, the flow rate of air supplied to the water tank 300 can be sufficiently secured.

Accordingly, the air guide 170 may include a guide part 172 formed in the flowing direction of air, and a change part 174 that is connected to the guide part 172 and changes the flow direction of guided air.

The air guide 170 may form the connection flow passage 103.

The guide part 172 may be formed in the substantially same direction as the filtering flow passage 102, and in this embodiment, may be formed in a vertical direction. The change part 174 may be formed in a direction crossing the filtering flow passage 102, and in this embodiment, may be formed in a substantially horizontal direction.

The change part 174 may be disposed at an upper side of the air guide 170. The change part 174 may be connected to the guide part 172 through a curved surface.

Although the change part 174 is formed in a horizontal direction, air passing the connection flow passage 103 may upwardly flow in a substantially oblique direction. The flow resistance of air can be reduced by allowing the change angle of the connection flow passage 103 and the filtering flow passage 102 to be similar to the straightly traveling direction.

The lower end of the guide part 172 may be fixed to the upper outer body 128. The upper end of the change part 174 may be fixed to the upper inner body 140.

A portion of the clean connection flow passage 104 may be formed outside the upper inner body 140. The air guide 170 may form a portion of the clean connection flow passage 104. Air passing the clean connection flow passage 104 may flow into the water tank 300 through the upper inlet 121 and the air wash inlet 31.

The upper inner body 140 may have a basket shape on the whole. The upper inner body 140 may have a circular shape in horizontal section, and the clean connection flow passage 104 may be formed in all directions of 360 degrees of a circumference of the upper inner body 140.

The air guide 170 may be a component for guiding filtered air to the clean connection flow passage 104, and may be omitted in accordance with embodiments. The air guide 170 may combine the upper inner body 140 or the upper outer body 128.

The air guide 170 may be formed to cover the upper inner body 140. Particularly, the air guide 170 may be formed to cover the upper inlet 121, and may guide filtered air to the upper inlet 121. When viewed from top, the air guide 170 may have a donut shape.

In this embodiment, the upper end of the air guide 170 may adhere closely to the upper end of the upper inner body 140.

When viewed from top, the upper side surface of the air guide 170 may coincide with the upper side surface of the upper inner body 140. In this embodiment, an upper inner body ring 126 may be disposed on the upper end of the upper inner body 140 to be coupled to or adhere closely to the air guide 170.

An inner body extension part 148 may be disposed to connect the upper inner body 140 and the upper inner body ring 126. The inner body extension part 148 may be disposed in plurality. An upper inlet 121 may be formed between the inner body extension part 148 and the upper inner body ring 126.

The inner body extension part 148 may correspond to a water tank body extension part 380. When the water tank 300 is placed, the water tank body extension part 380 may be located inside the inner body extension part 148. The inner body extension part 148 and the water tank body extension part 380 may overlap each other inside and outside.

The upper end of the air guide 170 may adhere closely to or be coupled to the upper inner body ring 126. The lower end of the air guide 170 may adhere closely to or be coupled to the upper outer body 128.

Accordingly, air flowing through the clean connection flow passage 104 between the upper inner body 140 and the upper outer body 128 may be guided to the upper inlet 121.

The diameter of the upper inner body ring 126 and the diameter of the upper end of the air guide 170 may be the same as or similar to each other. The air guide 170 and the upper inner body ring may adhere closely to each other to prevent leakage of filtered air. The upper inner body ring 126 may be disposed inside the air guide 170.

A grip 129 may be formed on the upper outer body 128. The air wash module 200 may be placed in the upper body, and the whole of the humidification and air cleaning apparatus can be lifted through the grip 129.

The upper inner body 140 may have the water tank insertion space 125 formed therein so as to receive the water tank 300.

The clean connection flow passage 104 may be disposed outside the upper inlet 121, and the water tank insertion space 125 may be disposed inside the upper inlet 121. Air flowing along the clean connection flow passage 104 may pass through the upper inlet 121. When the water tank 300 is placed in the water tank insertion space 125, filtered air passing through the upper inlet 121 may flow into the water tank 300.

Meanwhile, an outer visual body 214 may be coupled to the upper side of the upper body 120.

The outer visual body 214 may be a component of the visual body 210, but in this embodiment, may be fixed to the upper body 120. Unlike this embodiment, the outer visual body 214 may also be fixed to the air wash module 200. Unlike this embodiment, the outer visual body 214 may be omitted.

The outer visual body 214 may be fixed to the upper body 120. In this embodiment, the outer visual body 214 may be coupled to the upper outer body 128. The outer visual body 214 and the outer surface of the upper outer body 128 may form a continuous surface.

The outer visual body 214 may be formed of a material through which a user can see the inside of the outer visual body 214. The outer visual body 214 may be formed of a transparent or translucent material.

A display module 160 may be disposed in at least one of the air clean module 100 or the air wash module 200 to display the operational state to a user. In this embodiment, the display module 160 may be disposed in the base body 110 to display the operational state of the humidification and air cleaning apparatus to a user.

The display module 160 may be disposed inside the outer visual body 214. The display module 160 may be disposed to adhere closely to the inner side surface of the outer visual body 214. When viewed from top, the display module 160 may have a donut shape. The water tank 300 may be inserted into the display module 160.

The display module 160 may be supported by the outer visual body 214. The inner edge of the display module 160 may be supported by the upper inner body ring 126. The display module 160 may be disposed over the air guide 170. The display module 160 may be manufactured integrally with a base connector 260.

The display module 160 may be disposed over the air guide 170. The display module 160 may be disposed between the upper outer body 128 and the upper inner body 140. The display module 160 may cover the upper outer body 128 and the upper inner body 140 such that a user cannot see a gap between the upper outer body 128 and the upper inner body 140. The inside and the outside of the display module 160 may be sealed to prevent water from permeating between the upper outer body 128 and the upper inner body 140.

The inside of the display module 160 may be supported by the upper inner body 140, and the outside of the display module 160 may be supported by the outer visual body 218.

In this embodiment, the display 160 may have a ring shape. Unlike this embodiment, the display 160 may be formed into an arc shape. The surface of the display 160 may be formed of a material that can reflect light, or may be coated with a material that can reflect light.

Accordingly, when water drops are formed on the visual body 210, water drops formed on the visual body 210 may be projected onto or reflected by the surface of the display 160. When the water drops formed on visual body 210 flows down, the same effect is also shown on the display 160.

This effect may give a visual stimulus to a user, and a user may intuitively recognize that humidification is being performed. The water drop image projected on the display 160 may give a refreshment feeling to a user, and may allow a user to know the humidification state.

The upper side surface of the display 160 may be obliquely formed. The display 160 may be obliquely disposed toward a user. Accordingly, the inside of the display 160 may be high, and the outside thereof may be low.

Hereinafter, each configuration of the air wash module 200 will be described.

The air wash module 200 may increase humidity in the filtered air. The air wash module 200 may implement a rain view in the humidification flow passage 106. The air wash module 200 may spray and circulate water in the water tank 300. The air wash module 200 may change water into small-sized droplets, and may again wash filtered air through scattered droplets. When filtered air is washed through scattered droplets, humidification and filtering may be performed once again.

The air wash module 200 may include the humidification connection flow passage 105, the humidification flow passage 106, the discharge flow passage 107, and the water supply flow passage 109.

The air wash module 200 may include the water tank 300, the watering unit 400, the humidification medium 50, the visual body 210, the top cover assembly 230, and a handle 180.

The handle 180 may be coupled to the visual body 210, may rotate in the visual body 210, and may be held in the visual body 210. A user may simply lift up only the air wash module 200 through, and may separate the air wash module 200 from the air clean module 100.

The humidification connection flow passage 105 may be disposed outside the water tank 300, and may guide air into the water tank 300. The humidification connection flow passage 105 may be disposed outside the visual body 210, and may guide air into the visual body 210.

The humidification connection flow passage 105 may be disposed at the outside of at least one of the water tank 300 and the visual body 210, and may guide air into one of the water tank 300 and the visual body 210.

The discharge flow passage 107 may be disposed between the top cover assembly 230 and the visual body 210. The discharge flow passage 107 may be disposed in at least one of the top cover assembly 230 and the visual body 210.

In this embodiment, the discharge flow passage 107 may be formed between the top cover assembly 230 and the visual body 210, and the water supply flow passage 109 may be disposed at the center of the inside of the top cover assembly 230.

In the humidification and air cleaning apparatus according to this embodiment, a power source may be connected to the air clean module 100, and the air wash module 200 may be supplied with power through the air clean module 100.

Since the air wash module 200 has a structure separable from the air clean module 100, the air clean module 100 and the air wash module 200 may be provided with a separable power supply structure.

Since the air clean module 100 and the air wash module 200 are separably assembled through the upper body 120, a base connector 260 may be disposed in the upper body 120 to provide power for the air wash module 200.

The top cover assembly 230 of the air wash module 200 may be provided with a control part and a display which requires power. A top connector 270 may be disposed in the air wash module 200, and may be separably connected to the base connector 260. The top connector 270 may be disposed in the top cover assembly 230.

In this embodiment, since the top cover assembly 230 is separable, the inner side surface of the visual body 210 or the inner side surface of the water tank 300 can be conveniently cleaned.

The top cover assembly 230 may include the water supply flow passage 109 formed therein, and may form the discharge flow passage 107 with the visual body 210 in between. The top cover assembly 230 may be installed separably from the visual body 210. The top cover assembly 230 may include the top connector 270 disposed therein and electrically connected to the base connector 260.

When the top cover assembly 230 is placed, the top connector 270 may be disposed over the base connector 260. The top cover assembly 230 may be supplied with electricity from the base connector 260 via the top connector 270.

A water level display part 247 may be disposed around the water supply flow passage 109 to display the water level of the water tank 300. Thus, a user can check the water level of the water tank 300 when supplying water. By disposing the water level display part 247 on the movement line of water supply, a user can be prevented from excessively supplying water, and the water tank 300 can be prevented from overflowing.

The water level display part 247 may be disposed in the top cover assembly 230. The separable power supply structure of the top connector 270 and the base connector 260 may achieve effective water supply from the upper side.

The water tank 300 may be separably placed in the upper body 120. The watering unit 400 may be disposed inside the water tank 300, and may rotate inside the water tank 300.

The water tank 300 may include a water tank body 320 storing water, an air wash inlet 31 formed at the side surface of the water tank body 320, and a water tank body extension part 380 upwardly extending from the water tank body 320 and coupled to the visual body 210.

In this embodiment, the water tank body 320 may be formed into a cylindrical shape with an opened upper side. Unlike this embodiment, the water tank body 320 may be formed into various shapes.

The water tank body extension part 380 may upwardly extend from the water tank 300. The water tank body extension part 380 may form the air wash inlet 31. The air wash inlet 31 may be formed between the water tank body extension part 380.

The air wash inlet 31 may be formed in the side surface of the water tank body 320. The air wash inlet 31 may be formed on the water tank body 320 in all directions of 360 degrees of a circumference of the water tank body 320. The air wash inlet 31 may communicate with the humidification connection flow passage 105.

The water tank body extension part 380 may guide water flowing down from the inner side surface of the visual body 210 into the water tank 300. The noise of dropping water can be minimized by guiding water flowing down from the visual body 210.

The water tank body extension part 380 may be coupled to the lower end of the visual body 210.

In this embodiment, the air wash inlet 31 may be formed by the configuration of the water tank body 320. Unlike this embodiment, the air wash inlet 31 may also be formed by disposing the water tank body extension part 380 in the visual body 210. Also unlike this embodiment, a portion of a plurality of water tank body extension parts 380 may be disposed in the water tank 300, and other water tank body extension parts 380 may be disposed in the visual body 210 to configure the air wash inlet 31. Unlike this embodiment, the air wash inlet 31 may also be formed in a separate configuration distinguished from the visual body 210 and the water tank 300. Unlike this embodiment, the air wash inlet 31 may also be formed by forming an opened surface in the visual body 210 and by forming an opened surface in the water tank 300.

That is, the air wash inlet 31 may be disposed in at least one of the water tank 300 and the visual body 210. The air wash inlet 31 may be formed by combining the water tank 300 and the visual body 210. The air wash inlet 31 may be disposed in a separate configuration distinguished from the water tank 300 and the visual body 210, and then the separate configuration may be disposed between the water tank 300 and the visual body 210. The air wash inlet 31 may be formed by combination of the water tank 300 and the visual body 210.

The air wash inlet 31 may be disposed at the side of the air wash module 200, and may be connected to the humidification flow passage 106. The air wash inlet 31 may communicate or connect with the humidification connection flow passage 105.

The watering unit 400 may have a function of supplying water to the humidification medium 50. The watering unit 400 may have a function of visualizing the humidification process. The watering unit 400 may have a function of implementing a rain view inside the air wash module 200.

The watering unit 400 may draw water inside the water tank 300 by rotating a watering housing 800, may upwardly pump drawn water, and then may spray pumped water toward the outside in a radial direction. The watering unit 400 may include the watering housing 800 that draws water, upwardly pumps drawn water, and then sprays pumped water toward the outside in a radiation direction.

In this embodiment, the watering housing 800 may be rotated in order to spray water. Unlike this embodiment, water may also be sprayed using a nozzle instead of the watering housing. Water may be supplied to the humidification medium 50 by spraying water from the nozzle, and the rain view may be similarly implemented. According to embodiments, water may be sprayed from the nozzle, and the nozzle may be rotated.

Water sprayed from the watering housing 800 may wet the humidification medium 50. Water sprayed from the watering housing 800 may be sprayed toward at least one of the visual body 210 and the humidification medium 50.

Water sprayed toward the visual body 210 may implement a rain view. Water sprayed toward the humidification medium 50 may be used to humidify filtered air. The rain view may be implemented by spraying water toward the visual body 210, and then water flowing down from the visual body 210 may be used to wet the humidification medium 50.

In this embodiment, a plurality of nozzles having different heights may be disposed on the watering housing 800. Water discharged out of any one nozzle may form droplets on the inner side surface of the visual body 210 to implement a rain view, and water discharged out of another nozzle may wet the humidification medium 50 to be used for humidification.

The watering housing 800 may spray water to the inner side surface of the visual body 210, and sprayed water may flow down along the inner side surface of the visual body 210. Droplets formed in a form of water drop may be formed on the inner side surface of the visual body 210, and a user can see droplets through the visual body 210.

Particularly, water flowing down from the visual body 210 may wet the humidification medium 50 to be used for humidification. The humidification medium 50 may be wetted with water sprayed from the watering housing 800 and water flowing down from the visual body 210.

The visual body 210 may be coupled to the water tank 300, and may be located over the water tank 300. At least a portion of visual body 210 may be formed of a material through which a user can see the inside.

A display module 160 may be disposed outside the visual body 210. The display module 160 may be coupled to any one of the visual body 210 and the upper body 120.

The display module 160 may be disposed on a location where a user can observe a rain view. In this embodiment, the display module 160 may be disposed at the upper body 120.

When the air wash module 200 is placed, the outer surface of the visual body 210 may adhere closely to the display module 160. At least a portion of the surface of the display module 160 may be formed of or coated with a material that reflects light.

Droplets formed on the visual body 210 may also be projected onto the surface of the display module 160. Accordingly, a user can observe the motion of droplets at both visual body 210 and display module 160.

The water tank 300 may include the air wash inlet 31 which is formed thereon and through which air passes. The air wash inlet 31 may be located between the connection flow passage 103 and the humidification flow passage 106. The air wash inlet 31 may be an outlet of the connection flow passage 103, and may be an inlet of the humidification flow passage 106.

Filtered air supplied from the air clean module 100 may flow into the air wash module 200 through the air wash inlet 31.

The humidification medium 50 may include a water tank humidification medium 51 disposed at the inlet of the humidification flow passage 106, and a discharge humidification medium 55 disposed at the outlet of the humidification flow passage 106. The outlet of the humidification flow passage 106 and the inlet of the discharge flow passage 107 may be connected to each other. Accordingly, the discharge humidification medium 55 may be disposed at the discharge flow passage 107.

Since the connection flow passage 103, the humidification flow passage 106, and the discharge flow passage 107 are not formed of structures such as duct, it may be difficult to clearly distinguish the boundaries thereof. However, the humidification flow passage 106 in which humidification is performed is defined as between the water tank humidification medium 51 and the discharge humidification medium 55, the connection flow passage 103 and the discharge flow passage 107 may be naturally defined.

The connection flow passage 103 may be defined as between the blower housing 150 and the water tank humidification medium 51. The discharge flow passage 107 may be defined as after the discharge humidification medium 55.

In this embodiment, the water tank humidification medium 51 may be disposed at the air wash inlet 31 of the water tank 300.

The water tank humidification medium 51 may be located at at least one of the same plane, the outside, and the inside of the air wash inlet 31. Since the water tank humidification medium 51 is wetted with water for humidification, it may be desirable that the water tank humidification medium 51 is located at the inside of the air wash inlet 31.

Water flowing down after wetting the water tank humidification medium 51 may be stored in the water tank 300. Water flowing down after wetting the water tank humidification medium 51 may be configured so as not to flow out of the water tank 300.

Thus, the water tank humidification medium 51 may humidify filtered air passing through the air wash inlet 31.

Water that is naturally evaporated from humidification medium 50 may humidify filtered air. The natural evaporation means that water evaporates in a state where separated heat is not applied to water. As contact with air increases, as the flow velocity of air increases, as the pressure in the air decreases, the natural evaporation may be promoted. The natural evaporation may also be referred to as natural vaporization.

The humidification medium 50 may promote the natural evaporation of water. In this embodiment, the humidification medium 50 may be wetted with water, but may not be immersed in the water tank 300.

Since disposed separately from water stored in the water tank 300, the water tank humidification medium 51 and the discharge humidification medium 55 may not be always wet even though there is water stored in the water tank 300. That is, the water tank humidification medium 51 and the discharge humidification medium 55 may become wet only during the operation of humidification mode, and the water tank humidification medium 51 and the discharge humidification medium 55 may be maintained at a dry state during the operation of air cleaning mode.

The water tank humidification medium 51 may cover the air wash inlet 31, and air may penetrate the water tank humidification medium 51 to flow into the water tank 300.

The discharge humidification medium 55 may be disposed at the outlet of the humidification flow passage 106 or at the inlet of the discharge flow passage 107.

In this embodiment, the discharge humidification medium 55 may be disposed so as to cover the upper part of the visual body 210. The discharge humidification medium 55 may be placed on the visual body 210. Unlike this embodiment, the discharge humidification medium 55 may be coupled to the undersurface of the top cover assembly 230.

The discharge humidification medium 55 may cover the discharge flow passage 107, and humidified air may penetrate the discharge humidification medium 55 and then flow to the discharge flow passage 107.

Hereinafter, the top cover assembly 230 forming the discharge flow passage 107 will be described.

Figure 7:
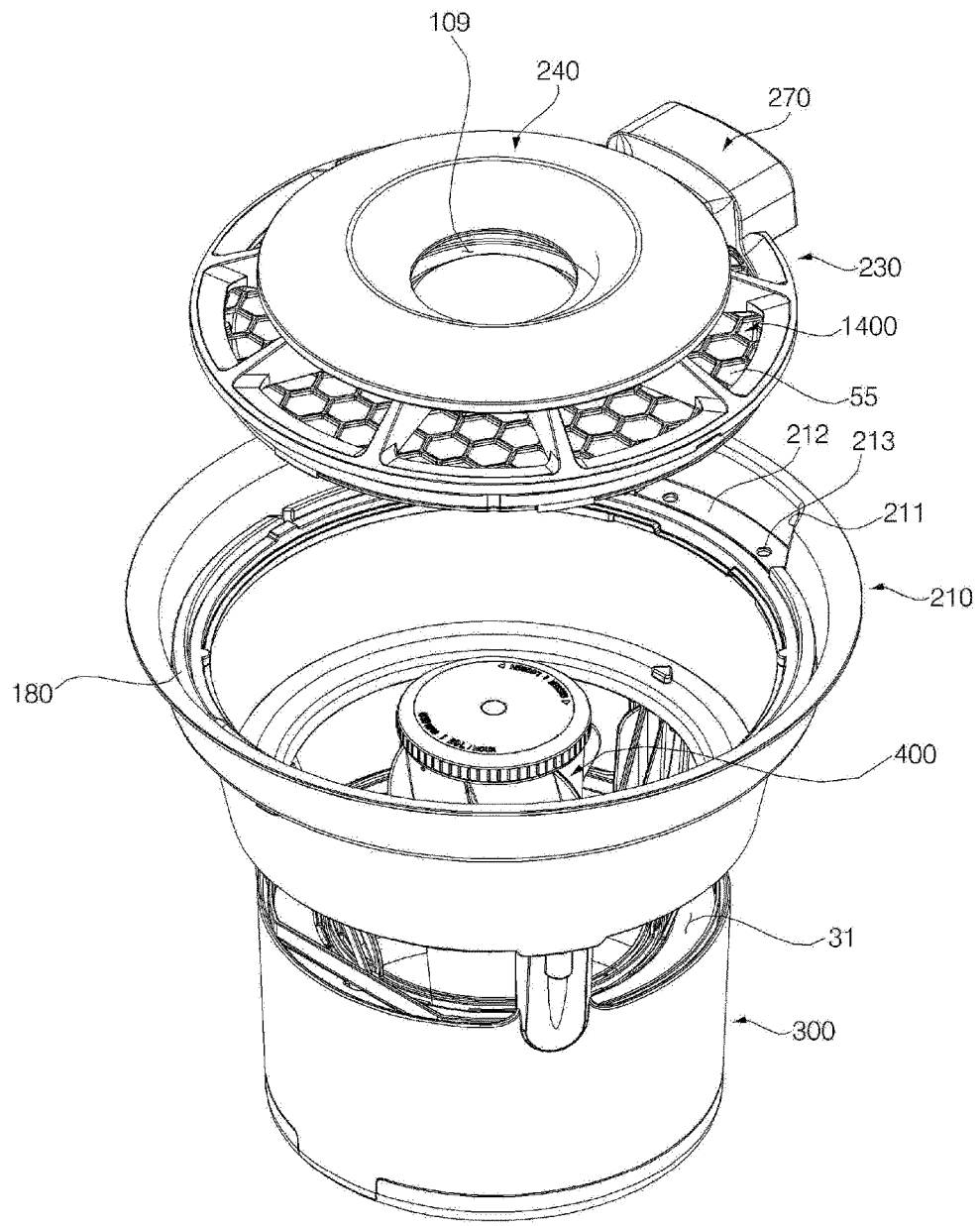
FIG. 7 is a perspective view illustrating a top cover assembly separated from the air wash module shown in FIG. 2.
Figure 8:
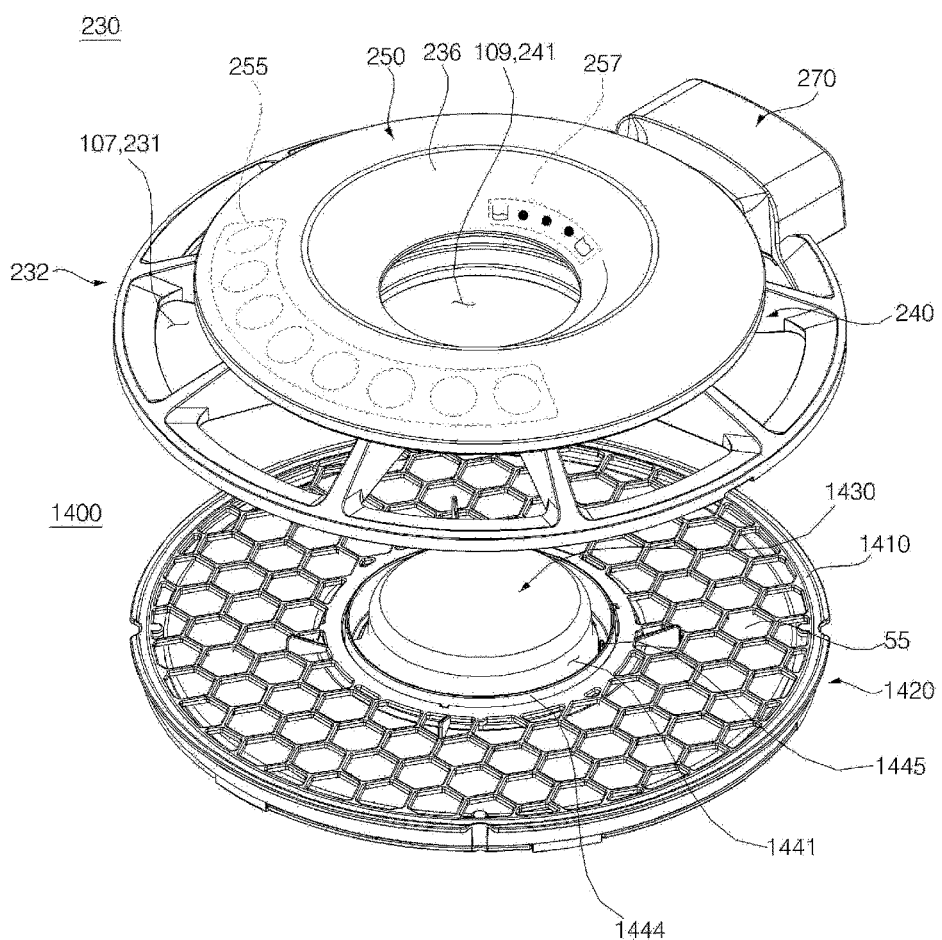
FIG. 8 is a perspective view illustrating the top cover assembly separated from the discharge humidification medium housing shown in FIG. 7.
Figure 9:
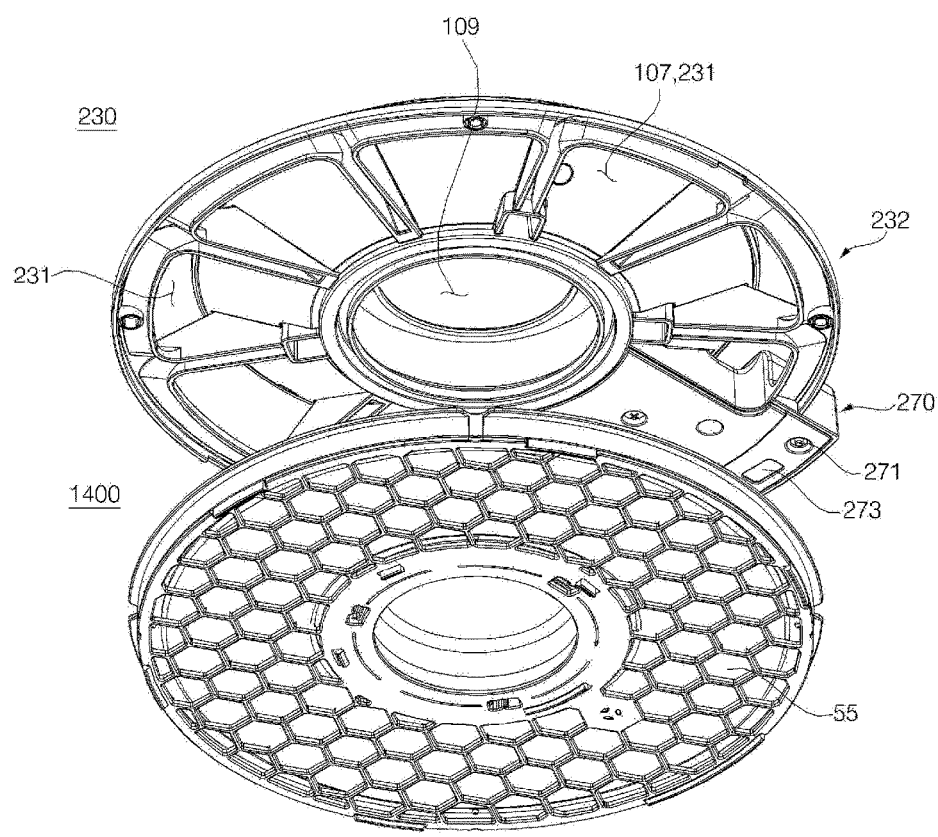
FIG. 9 is a perspective view illustrating the discharge humidification medium housing of FIG. 8 viewed from bottom.
Figure 10:
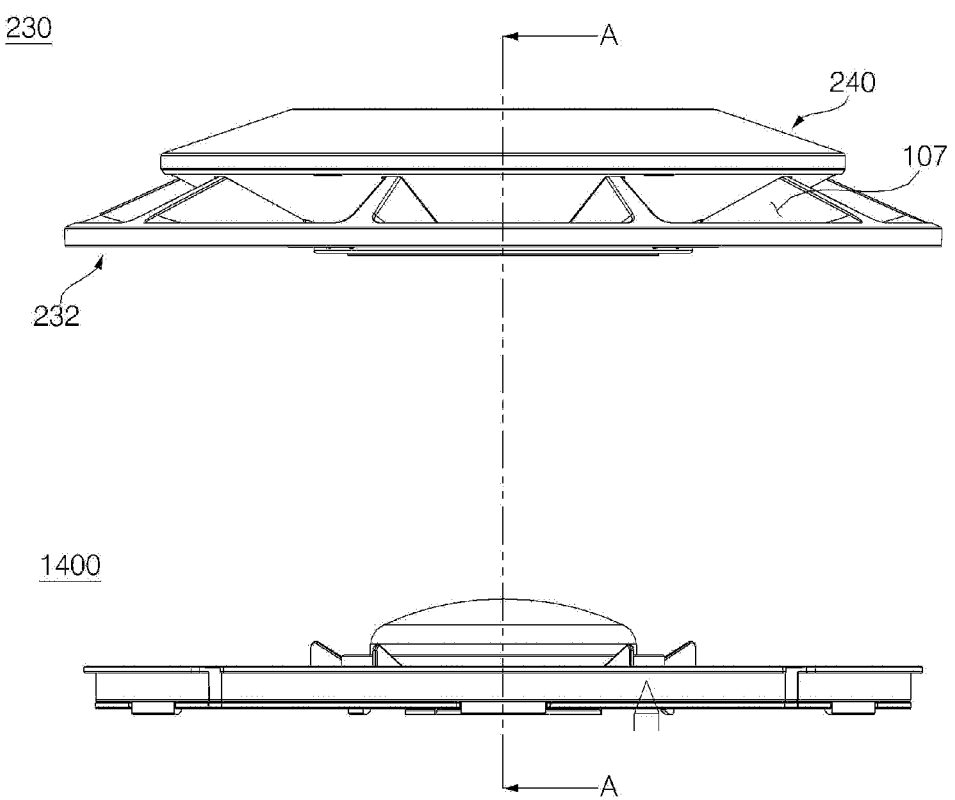
FIG. 10 is a front view of FIG. 8.
Figure 11:
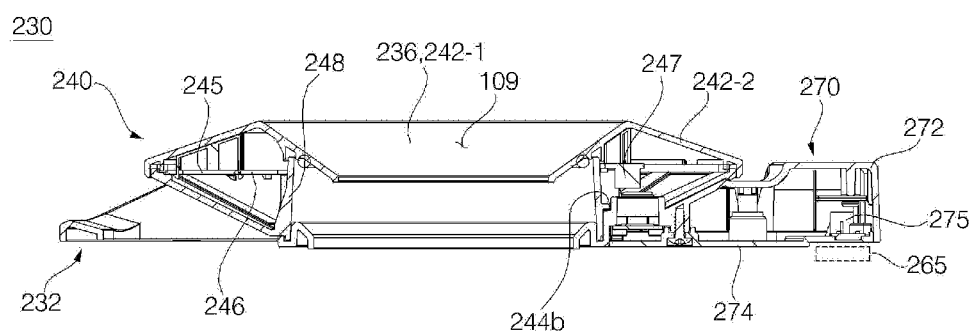
FIG. 11 is a cross-sectional view taken along line A-A of FIG. 10.
Figure 11:
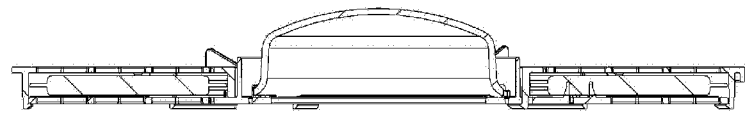
Figure 12:
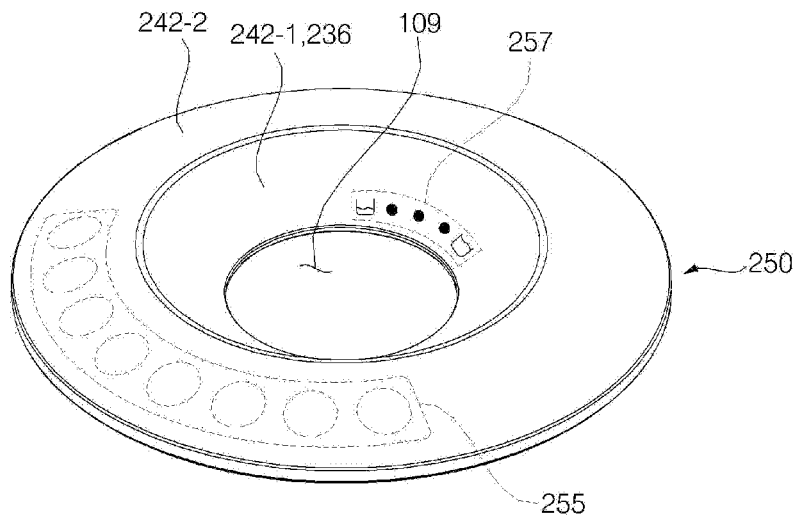
FIG. 12 is an exploded perspective view illustrating an upper operation housing separated from the top cover assembly of FIG. 8.
Figure 12:
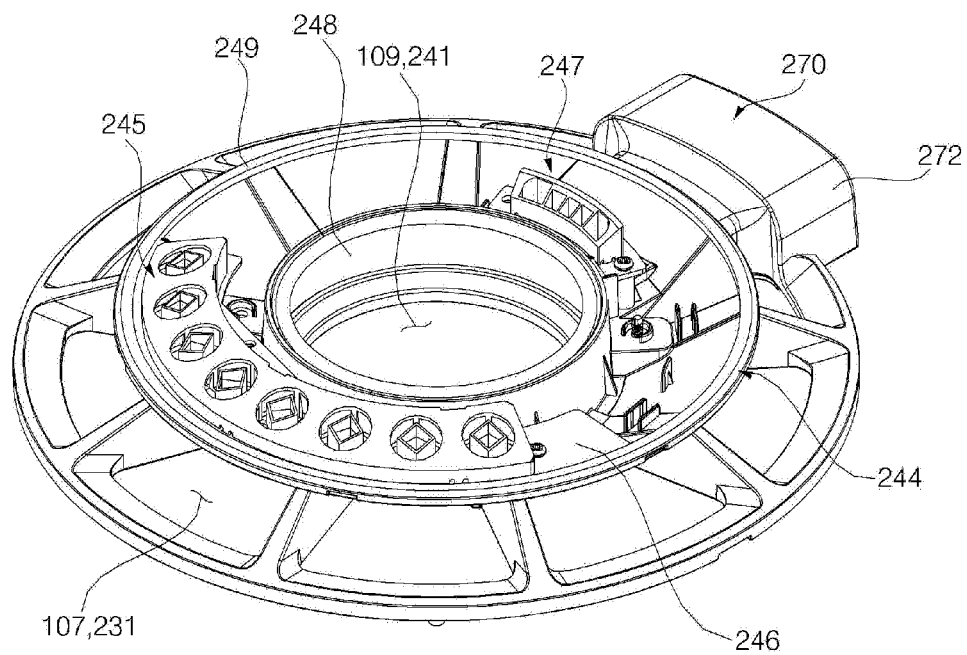
Figure 13:
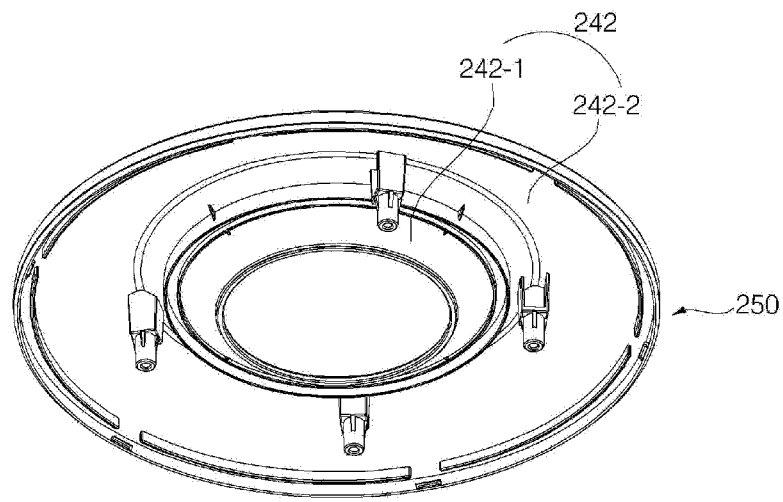
FIG. 13 is a perspective view of FIG. 12 viewed from bottom.
Figure 13:
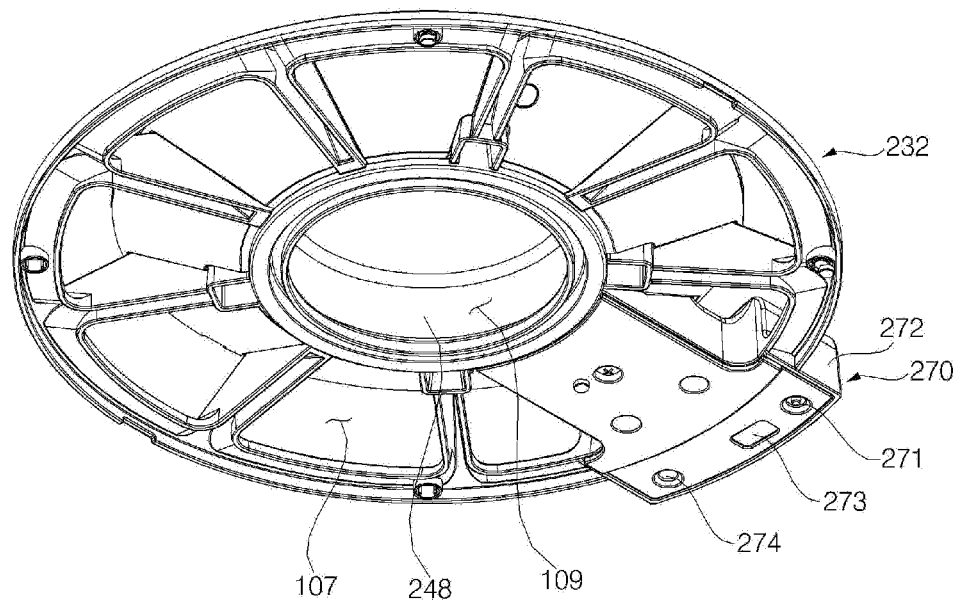

FIG. 7 is a perspective view illustrating a top cover assembly separated from the air wash module shown in FIG. 2. FIG. 8 is a perspective view illustrating the top cover assembly separated from the discharge humidification medium housing shown in FIG. 7. FIG. 9 is a perspective view illustrating the discharge humidification medium housing of FIG. 8 viewed from bottom. FIG. 10 is a front view of FIG. 8. FIG. 11 is a cross-sectional view taken along line A-A of FIG. 10. FIG. 12 is an exploded perspective view illustrating an upper operation housing separated from the top cover assembly of FIG. 8. FIG. 13 is a perspective view of FIG. 12 viewed from bottom.

In this embodiment, the water tank 300 and the visual body 210 may be manufactured into separate parts. Unlike this embodiment, the water tank 300 may be manufactured integrally with the visual body 210. For example, a portion of the water tank 300 may be formed of a transparent material through double injection molding. In this case, the visual body 210 may not be manufactured into a separate part.

In this embodiment, the top cover assembly 230 is described as being placed on the visual body 210. However, unlike this embodiment, when the visual body 210 is integrated with the water tank 300, the top cover assembly 230 may be disposed over the opened upper side of the water tank 300.

In this embodiment, the top cover assembly 230 may be separably placed on the visual body 210. The top cover assembly 230 may provide the water supply flow passage 109 for water supply, as well as the discharge flow passage 107.

In this embodiment, the top cover assembly 230 may be located over the discharge humidification medium 55. In this embodiment, a discharge humidification medium housing 1400 in which the discharge humidification medium 55 is disposed may be disposed, and the top cover assembly 230 may be disposed over the discharge humidification medium housing 1400. The discharge humidification medium housing 1400 may be placed over the visual body 210. The top cover assembly 230 may be placed over the discharge humidification medium housing 1400. The top cover assembly 230 may be integrally assembled with the discharge humidification medium housing 1400. In this embodiment, the top cover assembly 230 and the discharge humidification medium housing 1400 may be independently manufactured.

The top cover assembly 230 may be placed on and supported by the visual body 210, and may not apply a load to the discharge humidification medium housing 1400.

The discharge humidification medium housing 1400 may include the discharge humidification medium 55 disposed therein, and may cover the upper part of the visual body 210. The water supply flow passage 109 may be configured to pass the discharge humidification medium housing 1400. The discharge flow passage 107 may be configured to pass the discharge humidification medium housing 1400.

The top cover assembly 230 may include a top cover grille 232 forming the discharge flow passage 107 and the water supply flow passage 109, a control module 240 installed at the top cover grille 232, and a top connector 270 providing power or signals to the control module 240.

The top cover grille 232 may include a grille discharge port 231 forming at least a portion of the discharge flow passage 107, and a grille water supply port 233 forming at least a portion of the water supply flow passage 109. The grille discharge port 231 and the grille water supply port 233 may be opened in a vertical direction. The grille water supply port 233 may be disposed at the center of the inside of the top cover grille 232, and the grille discharge port 231 may be disposed outside the grille water supply port 232.

The top cover grille 232 may be separably placed on the visual body 210. The top cover grille 232 may be placed inside the visual body 210.

The control module 240 may be coupled to the top cover grille 232. The control module 240 may receive control signals from a user. The control module 240 may deliver the water level information to a user. The water supply flow passage 109 may be disposed in the control module 240. The control module 240 may electrically connected to the top connector 270, and may be provided with power from the top connector 270.

The operation module 240 may include an operation housing 250 coupled to the top cover grille 232 and including at least a portion of the water supply flow passage 109 formed therein, an operation space 243 formed inside the operation housing 250, an input unit 245 disposed on the operation housing 250, a water level display unit 247 disposed on the operation housing 250, and an operation controller 246 for controlling the input unit 245 and the water level display unit 247.

The operation housing 250 may include an upper operation housing 242 and a lower operation housing 244.

The operation space 243 may be formed between the upper operation housing 242 and the lower operation housing 244, and may be sealed to prevent infiltration of water. The input unit 245, the water level display unit 247, and the operation controller 246 may be disposed in the operation space 243.

The water supply flow passage 109 may be formed in the control module 240. A portion of the water supply flow passage 109 may be formed at the center of the operation module 240 in a vertical direction. An operation water inlet 241 forming at least a portion of the water supply flow passage 109 may be formed in the operation module 240. The operation water inlet 241 may be disposed inside the operation housing 250, and may be opened in a vertical direction.

The operation water inlet 241 may be formed by an inner wall 248. The inner wall 248 may be disposed in at least one of the upper operation housing 242 and the lower operation housing 244. In this embodiment, the lower operation housing 244 and the inner wall 248 may be manufactured into one body. Unlike this embodiment, the upper operation housing 242 and the inner wall 248 may also be manufactured into one body. Accordingly, the operation space 243 may be formed among the upper operation housing 242, the lower operation housing 244, and the inner wall 248.

Although not shown in this embodiment, a water filter (not shown) may be disposed in the water supply flow passage 109 or the water tank 300. The water filter may change hard water into soft water. The water filter may be disposed in the operation housing, and water may be softened by gravity and then move into the water tank 300.

An upper water supply guide 236 may be disposed in the upper operation housing 242 to guide water supplied from the upper side to the operation water inlet 241. The upper water supply guide 236 may be manufactured into a separate part, or may be a portion of the upper operation housing 242.

The upper operation housing 242 according to this embodiment may include an inner inclination surface 242-1 and an outer inclination surface 242-2. The upper water supply guide 236 may be formed in the inner inclination surface 242-1.

The inner side of the upper operation housing 242 adjacent to the operation water inlet 241 may be obliquely formed to form the upper water supply guide 236.

The outer inclination surface 242-2 may be formed to incline to the opposite direction to the inclination direction of the upper water supply guide 236. When the inner inclination surface 242-1 inclines to the operation water inlet 241, the outer inclination surface 242-2 may incline to the outside.

The upper water supply guide 236 may not be limited to the inner inclination surface 242-1 in configuration. The upper water supply guide 236 may be a structure of a hopper shape. A separate water tank may be disposed over the top cover assembly 230, and the upper water supply guide 236 may connect the water tank and the operation water inlet 241. The upper water supply guide 236 may be a flow passage for guiding water.

The input unit 245 may be a touch panel that can sense a touch operation of a user. The input unit 245 may receive a touch operation of a user by a resistive method or a capacitive method. Unlike this embodiment, the input unit 245 may be a button.

The input unit 245 may be disposed on the undersurface of the upper operation housing 242. The input unit 245 may include a light emitting member (not shown) disposed therein, and light may be selectively generated from the light emitting member.

For example, when there is a need to receive from an operation signal from a user, the input unit 245 may emit light. For example, when there is a need to allow a user to recognize an operation signal inputted by the user, the input unit 245 may emit light. Also, when the humidification and air cleaning apparatus operates according to an operation signal inputted by a user, the input unit 245 may emit light.

The surface of the upper operation housing 242 may be coated with a material that selectively transmits light. Accordingly, light emitted from the input unit 245 may transmit the upper operation housing 242, and a user can see light. When the input unit 245 does not emit light, external light may be reflected from the surface of the upper operation housing, and a user cannot recognize the location of the input unit 245.

The input unit 245 may be disposed under the outer inclination surface 242-2. The water level display unit 247 may be disposed under the inner inclination surface 242-1.

The input unit 245, the operation water inlet 241, and the water level display unit 247 may be disposed on a straight line. The input unit 245, the operation water inlet 241, and the water level display unit 247 may be disposed on a user's eye line.

The input unit 245 may be located at the front, and the operation water inlet 241 may be located at the rear of the input unit 245. Also, the water level display unit 247 may be disposed at the rear of the operation water inlet 241.

Accordingly, when a user supplies water from the upper side, a user can check the water level display unit 247 while pouring water into the operation water inlet 241.

Also, an input unit display region 255 on which the input unit 245 is displayed and a water level display region 257 on which the water level display unit 247 is displayed may be disposed in the operation housing 250.

The inner inclination surface 242-1 and the outer inclination surface 242-2 may have an inclination opposite to each other based on the operation water inlet, but may have the same inclination direction based on an eye line direction of a user.

The input unit display region 255 may be disposed on the outer inclination surface 242-2, and the water level display region 257 may be disposed on the inner inclination surface 242-1. The input unit display region 255 and the water level display region 256 may be disposed to incline in the same direction with respect to the eye line of a user.

The input unit display region 255 and the water level display region 256 may be disposed to incline toward the front side.

The operation controller 246 may sense and analyze a signal of the input unit 245, and then may deliver the signal to a controller (not shown). The controller may be disposed in the base body 110.

The input unit 245 may be concealed in the upper operation housing 242, and the location of the input unit 245 may be exposed to a user by emitting light only when operating. The input unit 245, the water level display unit 247, and the operation controller 246 may be supplied with power through the base connector 260.

The operation space 243 may be sealed to prevent infiltration of water. For this, a gasket 249 may be disposed between the upper operation housing 242 and the lower operation housing 244.

The operation housing 250 and the top connector 270 may be separately manufactured and then may be assembled. In this embodiment, the operation controller 246 and the top connector 270 may be connected through the lower operation housing 244. A connector connection hole 244*b* for connection with the top connector 270 may be formed in the lower operation housing 244.

A portion of the top connector 270 may be penetratively inserted into the connector connection hole 244*b*, and may be electrically connected to internal parts in the operation space 243. Since the top connector 270 is coupled through the lower operation housing 244, a sealing structure can be more easily configured. Although water flows down to the outer inclination surface 242-2, water cannot infiltrate into the connector connection hole 244*b*.

The top connector 270 may be assembled with the operation module 240 to constitute the top cover assembly 230. Since the top connector 270 and the base connector 260 can be separated, the top cover assembly 230 may be separably placed on the visual body 210, and power or electric signals can be transmitted and received to/from the base body 110.

When the top connector 270 is placed on the base connector 260, the top connector 270 may be electrically connected to the base connector 260. When the top connector 270 is separated from the base connector 260, the top connector 270 may be electrically cut off from the base connector 260.

The top connector 270 may be placed over the base connector 260 without a separate structure. For example, when the top cover assembly 230 is placed on the visual body 210, the top connector 270 and the base connector 260 may be located outside the visual body 210.

In this embodiment, since the top connector 270 is located inside the visual body 210, the top connector 270 may be disposed at an upper side of the visual body 210, and the base connector 260 may be disposed at a lower side of the visual body 210.

That is, the top connector 270 and the base connector 260 may be separated from each other based on the visual body 210. Accordingly, the top connector 270 and the base connector 260 need to transmit power and signals through the visual body 210.

In this embodiment, the top connector 270 and the base connector 260 may be electrically connected through a direct contact, and thus provide power.

In this embodiment, the top connector 270 and the base connector 260 may transmit a signal through a wireless communication. Unlike this embodiment, a communication signal may also be transmitted through a direct contact.

The visual body 210 may include a connector support on which the top connector 270 is placed. At least a portion of the top connector 270 may be placed on the connector support 212. The top connector 270 may be located over the connector support 212, and the base connector 260 may be located under the connector support 212.

The top connector 270 may be limited in horizontal movement when being placed on the connector support 212. For this, the visual body 210 may include a connector stopper 211 formed therein and limiting the horizontal movement of the top connector 270. When the top connector 270 is placed, the connector stopper 211 may be adhered closely to the side part of the top connector 270.

The visual body 210 may include a connector opening 213 formed therein. The connector opening 213 may be formed to penetrate the visual body 210. The connector opening 213 may be formed to be opened in a vertical direction.

The connector opening 213 and the connector support 212 may be disposed at different locations. In this embodiment, the connector opening 213 may be disposed in the connector support 212. A portion of the connector support 212 may be opened to form the connector opening 213.

A first connector electrode 261 may be disposed in at least one of the top connector 270 and the base connector 260, and a second connector electrode 271 may be disposed in the other one.

The first connector electrode 261 disposed in one of the top connector 270 and the base connector 260 may penetrate the connector opening 213, and may contact the second connector electrode 271 disposed in the other one.

When the first connector electrode 261 and the second connector electrode 271 contact each other, the first connector electrode 261 and the second connector electrode may be electrically connected to each other. When the first connector electrode 261 and the second connector electrode 271 are separated from each other, the first connector electrode 261 and the second connector electrode 271 may be electrically cut off from each other.

In this embodiment, the first connector electrode 261 may be disposed in the base connector 260, and the second connector electrode 271 may be disposed in the top connector 270. Unlike this embodiment, the first connector electrode may be disposed in the top connector 270, and the second connector electrode may be disposed in the base connector 260.

The top connector 270 may include a top connector housing 272 and a top connector cover 274. In this embodiment, the top connector housing 272 may be manufactured integrally with the top cover grille 232. Unlike this embodiment, the top connector housing 272 may be separately manufactured, and then may be assembled with the top cover grille 232.

The top connector housing 272 may have a lower side surface thereof opened. The top connector cover 274 may be assembled with the top connector housing 272, and may cover the undersurface of the top connector housing 272 which is opened.

The base connector 260 and the top connector 270 may communicate electrical signals except power with each other by a non-contact method. For the wireless communication between the base connector 260 and the top connector 270, various communication modules may be used.

Since the base connector 260 and the top connector 270 are adjacent to each other, IR, Zigbee, NFC, and Bluetooth which are appropriate for a local area network may be used.

In this embodiment, the base connector 260 and the top connector 270 may communicate with each other through an IR signal. In order to deliver an IR signal, the connector support 212 may be formed of a material which an IR signal transmits. In this embodiment, the connector support 212 may be formed of a transparent material. Since the whole of the visual body 210 is formed of a transparent material that light can transmit, a separate material may not be needed only for the connector support 212.

A base connector window 263 which an IR signal can transmit may be disposed in the base connector 260. A top connector window 273 which an IR signal can transmit may be disposed in the top connector 270.

A top connector communication unit 275 may be disposed over the top connector window 273. A base connector communication unit 265 may be disposed under the base connector window 263.

A signal transmitted from the top connector communication unit 275 may be sent to the base connector communication unit 265 via the top connector window 273, the connector support 212, and the base connector window 263.

On the other hand, a signal transmitted from the base connector communication unit 265 may be sent to the top connector communication unit 275 via the base connector window 263, the connector support 212, and the top connector window 273.

A signal transmitted from the top connector communication unit 275 to the base connector communication unit 265 may be an operation signal of a user which is inputted into the operation module 240. A signal transmitted from the base connector communication unit 265 to the top connector communication unit 275 may be a signal for controlling the water level display unit 247.

On the other hand, the discharge humidification medium housing 1400 may be disposed under the top cover assembly 230. A user can supply water through the operation water inlet 241 formed in the top cover assembly 230.

In the top cover assembly 230, the water supply cap 1430 may be exposed through the operation water inlet 241.

The discharge humidification medium housing 1400 may allow air to pass the outside thereof and may allow water to pass the inside thereof. Air may pass from lower side to upper side, and water may pass from upper side to lower side.

The discharge humidification medium housing 1400 may provide the discharge flow passage 107 through which air passes at the outside, and may provide the water supply flow passage 109 through which water passes at the inside.

The discharge humidification medium housing 1400 may include an upper housing 1410, a lower housing 1420, and a water supply cap 1430. The discharge humidification medium 55 may be disposed between the upper housing 1410 and the lower housing 1420.

The upper housing 1410 and the lower housing 1420 may have a plurality of air gaps formed therein. The upper housing 1410 and the lower housing 1420 may have a donut shape on the whole.

The water supply cap 1430 may be assembled with the opened inner sides of the upper housing 1410 and the lower housing 1420 The water supply cap 1430 may be separably coupled to one of the upper housing 1410 and the lower housing 1420.

A reservoir 1441 may be formed outside the water supply cap 1430, and may temporarily store water supplied through the water supply flow passage 109. The water supply hole 1445 may be formed in the reservoir 1441, and the water supply hole 1445 may guide water to the humidification flow passage 106.

The discharge humidification medium housing 1440 may include a reservoir wall 1444 formed therein. The reservoir 1441 may be formed between the reservoir wall 1444 and the water supply cap 1430.

The reservoir wall 1444 may be formed in at least one of the upper housing 1410 and the lower housing 1420.

A user can supply water from the upper side of the top cover assembly 230. Water dropping into the operation water inlet 241 may flow along the surface of the water supply cap 1430 to be temporarily stored in the reservoir 1441, and then may flow down under the discharge humidification medium housing 1400 through a water supply hole 1445.

Water passing the water supply hole 1445 may drop into the visual body 210, and then may drop on the watering housing 800.

When the watering housing 800 rotates, water supplied from the upper side may be scattered to the inner side surface of the visual body 210. Thereafter, scattering water may flow along the inner side surface of the visual body 210, and then may be stored in the water tank 300 to increase the water level of the water tank 300.

The controller may determine a signal sensed by a water level sensor (not shown), and may display the water level of the water tank 300 on the water level display unit 247.

Upon water supply from the upper side, a user cannot see the water level inside the water tank 300, but can immediately check an elevated water level through the water level display unit 247 disposed around the operation water inlet 241.

Since a user can check the water level through the water level display unit 247 during the water supply from the upper side, the flow rate of water supply from the upper side can be controlled.

In this embodiment, the top cover assembly 230 has been described as being separable from the visual body 210.

Unlike this embodiment, the top cover assembly 230 may be a structure that is not separable. That is, the top cover assembly 230 may be assembled with or fixed to the visual body 210. Also, the top cover assembly 230 may be fixed to the water tank integrated with the visual body. When the top cover assembly 230 is fixed to the visual body or the water tank, the top connector and the base connector may be connected to each other.

A humidification and air cleaning apparatus according to an exemplary embodiment of the present invention has at least one of the following effects.

First, since the water supply flow passage and the discharge flow passage is separately configured, water can be poured and supplied even when air is being discharged.

Second, when water supply from the upper side is performed by pouring water into the operation water inlet, the level of water stored in the water tank can be immediately checked.

Third, the top cover assembly embedded with an electric circuit can be separated, and can be electrically connected only when being placed on the visual body.

Fourth, since the top cover assembly is separable from the visual body, the whole of the humidification module from which the top cover assembly is separated can be washed and cleaned with water.

Fifth, since the base connector and the top connector are electrically connected through the visual body, power can be supplied even when the top cover assembly is placed on the visual body.

Sixth, since power is supplied through the contact of the top connector and the base connector, and since the control signals are wirelessly transmitted and received through the communication unit, electrical contact can be minimized.

Seventh, since the water supply flow passage is disposed inside the operation module, and since the discharge flow passage is disposed outside the operation module, an interference between supplied water and discharged air can be minimized, and water supply from the upper side can be performed even when air is being discharged for humidification.

Eighth, since the water level of the water tank is displayed on the operation housing in which the water supply flow passage is formed, during the water supply from the upper side, a user can control the amount of supplied water while checking the water level.

Ninth, even though the top cover assembly is separably placed on the visual body, power can be supplied from the outside to operate the operation module.

The effects of the present invention are not limited to the above; other effects that are not described herein will be clearly understood by the persons skilled in the art from the following claims.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A humidification and air cleaning apparatus comprising:
    a base body having a insertion space formed therein;
    a water tank to store water, separably placed in the insertion space of the base body;
    a top cover assembly disposed over an opened upper part of the water tank;
    an air wash inlet formed at a side of the water tank to receive air into the water tank;
    a discharge flow passage formed in at least one of the top cover assembly and the water tank, or formed between the top cover assembly and the water tank to discharge air in the water tank; and
    a water supply flow passage formed in the top cover assembly to guide water into the water tank.

2. The humidification and air cleaning apparatus of claim 1, wherein when water is supplied from the upper side of the top cover assembly, and the supplied water flows into the water tank through the water supply flow passage.

3. The humidification and air cleaning apparatus of claim 1, wherein the top cover assembly is separable from the water tank.

4. The humidification and air cleaning apparatus of claim 1, wherein the water tank comprises a visual body formed of a transparent material, and
    the visual body is separable from the base body together with the water tank.

5. The humidification and air cleaning apparatus of claim 1, wherein:
    the base body comprises a base connector;
    the top cover assembly comprises a top connector; and
    the base connector and the top connector are electrically connected to each other.

6. The humidification and air cleaning apparatus of claim 5, wherein:
    at least a portion of the water tank comprises a visual body formed of a transparent material,
    the visual body comprises a connector opening, and
    when the top cover assembly is placed in the visual body, the base connector and the top connector are electrically connected to each other through the connector opening.

7. The humidification and air cleaning apparatus of claim 6, wherein the visual body further comprises a connector support on which the top connector is placed, and the connector opening is formed in the connector support.

8. The humidification and air cleaning apparatus of claim 5, wherein:
    the base connector further comprises a base connector communication unit;
    the top connector further comprises a top connector communication unit; and
    control signals of the base connector communication unit and the top connector communication unit are mutually transmitted and received through the visual body.

9. The humidification and air cleaning apparatus of claim 8, wherein:
    the base connector communication unit and the top connector communication unit mutually transmit and receive a control signal through an IR signal; and
    the connector support is formed of a transparent material that transmits an IR signal.

10. The humidification and air cleaning apparatus of claim 1, wherein the top cover assembly comprises:
    a top cover grille having the water supply flow passage and the discharge flow passage separated from each other;
    an operation module assembled with the top cover grille to receive an operation signal from a user; and
    a top connector to provide power or a control signal to the operation module, and
    when the top cover assembly is placed in the visual body, the base connector and the top connector are electrically connected to each other.

11. The humidification and air cleaning apparatus of claim 10, wherein the operation module further comprises an upper water supply guide to guide water supplied from the upper side into the water supply flow passage.

12. The humidification and air cleaning apparatus of claim 10, wherein the operation module further comprises an operation water inlet forming at least a portion of the water supply flow passage therein, and
    the water supply flow passage formed in the top cover grille communicates with the operation water inlet.

13. The humidification and air cleaning apparatus of claim 10, wherein the operation module comprises:
    an operation housing assembled with the top cover grille;
    an operation water inlet formed inside the operation housing and forming at least a portion of the water supply flow passage;
    an input unit disposed in the operation housing to receive an operation signal from a user; and
    an operation controller to control the input unit,
    wherein the operation controller is electrically connected to the top connector.

14. The humidification and air cleaning apparatus of claim 13, wherein the operation housing comprises:
    an upper operation housing having the water supply flow passage formed therein;
    a lower operation housing assembled with the upper operation housing and having the water supply flow passage therein; and
    an inner wall disposed in at least one of the upper operation housing and the lower operation housing, and having the operation water inlet.

15. The humidification and air cleaning apparatus of claim 14, wherein the upper operation housing, the lower operation housing and the inner wall forms an operation space,
wherein the operation space is sealed from the water supply flow passage, and
the operation controller and the input unit are disposed in the operation space.

16. The humidification and air cleaning apparatus of claim 14, wherein the upper operation housing further comprises an upper water supply guide to guide water supplied from the upper side into the operation water inlet, and the upper water supply guide is an inclination surface formed on the upper operation housing.

17. The humidification and air cleaning apparatus of claim 13, wherein the operation module further comprises a water level display unit that displays a water level of the water tank, and
upon water supply from the upper side, the water level display unit displays the water level on the operation housing.

18. The humidification and air cleaning apparatus of claim 17, wherein:
the operation housing has an upper side surface thereof comprising an inner inclination surface that inclines toward the operation water inlet and an outer inclination surface that inclines in an opposite direction to the inner inclination surface;
the input unit is disposed on the outer inclination surface and the water level display unit is disposed on the inner inclination surface; and
the input unit, the operation water inlet, and the water level display unit are disposed on a straight line with respect to an eye line of a user.

19. The humidification and air cleaning apparatus of claim 1, comprising a discharge humidification medium disposed under the top cover assembly,
wherein the discharge humidification medium covers the discharge flow passage, and humidifies air passing through the discharge flow passage.

* * * * *